United States Patent
Chuttani et al.

(10) Patent No.: US 9,967,808 B2
(45) Date of Patent: May 8, 2018

(54) SYSTEM SELECTION FOR MULTI-SIM DEVICES

(71) Applicant: Apple Inc., Cupertino, CA (US)

(72) Inventors: Harshit Chuttani, Newark, CA (US); Li Su, San Jose, CA (US); Madhusudan Chaudhary, Campbell, CA (US); Sang Ho Baek, Palo Alto, CA (US); Someet K. Lal, Fremont, CA (US); Thanigaivelu Elangovan, Santa Clara, CA (US); Rajesh Ambati, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 14/717,510

(22) Filed: May 20, 2015

(65) Prior Publication Data

US 2016/0345244 A1   Nov. 24, 2016

(51) Int. Cl.
| | |
|---|---|
| *H04W 4/00* | (2009.01) |
| *H04W 48/16* | (2009.01) |
| *H04W 4/02* | (2018.01) |
| *H04W 48/18* | (2009.01) |
| *H04W 88/06* | (2009.01) |

(52) U.S. Cl.
CPC .......... *H04W 48/16* (2013.01); *H04W 4/021* (2013.01); *H04W 48/18* (2013.01); *H04W 88/06* (2013.01)

(58) Field of Classification Search
CPC ... H04W 48/18; H04W 60/005; H04W 88/06; H04W 8/005; H04W 52/0229
USPC ............ 455/452.1, 434, 435.3, 435.2, 426.1, 455/414.1
See application file for complete search history.

(56) References Cited

U.S. PATENT DOCUMENTS

| | | | |
|---|---|---|---|
| 8,862,127 B2 | 10/2014 | Shin | |
| 8,977,261 B2* | 3/2015 | Chin | H04W 60/005 455/435.1 |
| 9,319,863 B2* | 4/2016 | Peruru et al. | H04W 76/025 455/435.2 |
| 2012/0058748 A1* | 3/2012 | Jeung | H04W 88/06 455/414.1 |
| 2012/0178500 A1 | 7/2012 | Hwang | |
| 2013/0295920 A1* | 11/2013 | Viswanadham | H04W 36/14 455/426.1 |
| 2015/0004973 A1 | 1/2015 | Gude et al. | |
| 2015/0079986 A1* | 3/2015 | Nayak | H04W 52/0229 455/435.2 |
| 2015/0126187 A1* | 5/2015 | Ponukumati | H04W 72/02 455/434 |
| 2015/0245309 A1* | 8/2015 | Nayak | H04W 60/005 455/435.3 |
| 2015/0296364 A1* | 10/2015 | Peruru | H04W 8/005 455/434 |
| 2015/0327159 A1* | 11/2015 | Gude | H04W 48/18 455/434 |

(Continued)

*Primary Examiner* — Joseph Arevalo
(74) *Attorney, Agent, or Firm* — Meyertons Hood Kivlin Kowert & Goetzel, P.C.; Jeffrey C. Hood

(57) ABSTRACT

Apparatuses, systems, and methods for multi-SIM user equipment (UE) devices to perform system selection. A UE may determine to perform system selection for a first SIM of the UE. Information, such as serving cell and/or neighboring cell information, may be obtained from a second SIM of the UE. System selection for the first SIM may be performed based at least in part on the information obtained from the second SIM.

18 Claims, 11 Drawing Sheets

(56) References Cited

U.S. PATENT DOCUMENTS

2015/0334575 A1* 11/2015 Joshi ................. H04W 72/0453
          370/329
2016/0021660 A1* 1/2016 Krishnamurthy ..... H04W 72/02
          455/434

* cited by examiner

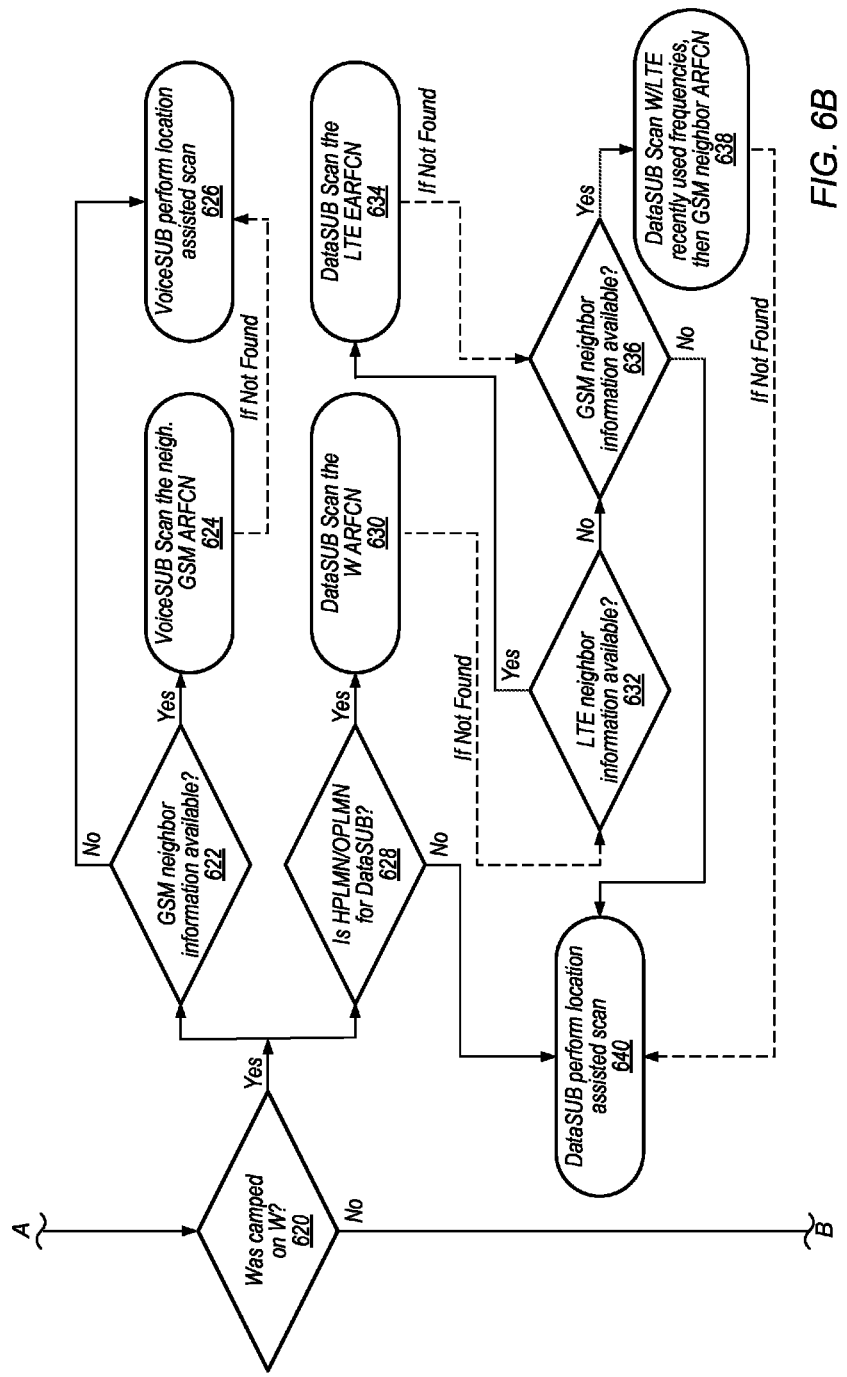

SYSTEM SELECTION FOR MULTI-SIM DEVICES

FIELD

The present application relates to wireless devices, including apparatuses, systems, and methods for multi-SIM wireless devices to perform system selection.

DESCRIPTION OF THE RELATED ART

Wireless communication systems are rapidly growing in usage. Further, wireless communication technology has evolved from voice-only communications to also include the transmission of data, such as Internet and multimedia content. In certain scenarios a wireless device may include or be capable of utilizing multiple subscriber identity modules (SIMs). Determining how to operate effectively and efficiently with multi-SIM capability may be a challenging problem. Thus, improvements in the field are desired.

SUMMARY

Embodiments are presented herein of apparatuses, systems, and methods for a multi-SIM device to perform system selection.

According to the techniques described herein, a wireless device may determine to perform system selection for a first SIM of the wireless device. As part of the system selection process, certain information which may help facilitate the system selection process may be obtained from a second SIM of the wireless device.

For example, if the second SIM is registered with a public land mobile network (PLMN) and attached to a serving cell, information regarding the serving cell of the second SIM, and/or neighbor cell information for the second SIM, may be usable by the first SIM to quickly target candidate cells from which service for the first SIM might be obtained.

Thus, the wireless device may be able to perform system selection for a first SIM of the wireless device using information obtained from a second SIM of the wireless device. The usability of the information obtained from the second SIM for system selection for the first SIM may vary in different scenarios, e.g., based on subscription differences (e.g., PLMN and/or radio access technology (RAT) permission differences), configuration details of the dual SIM configuration of the wireless device, radio conditions at the location of the wireless device, etc. In many instances, such techniques may allow a SIM to obtain service more quickly than by performing a more broad scan, such as a blind scan or a location-based scan.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
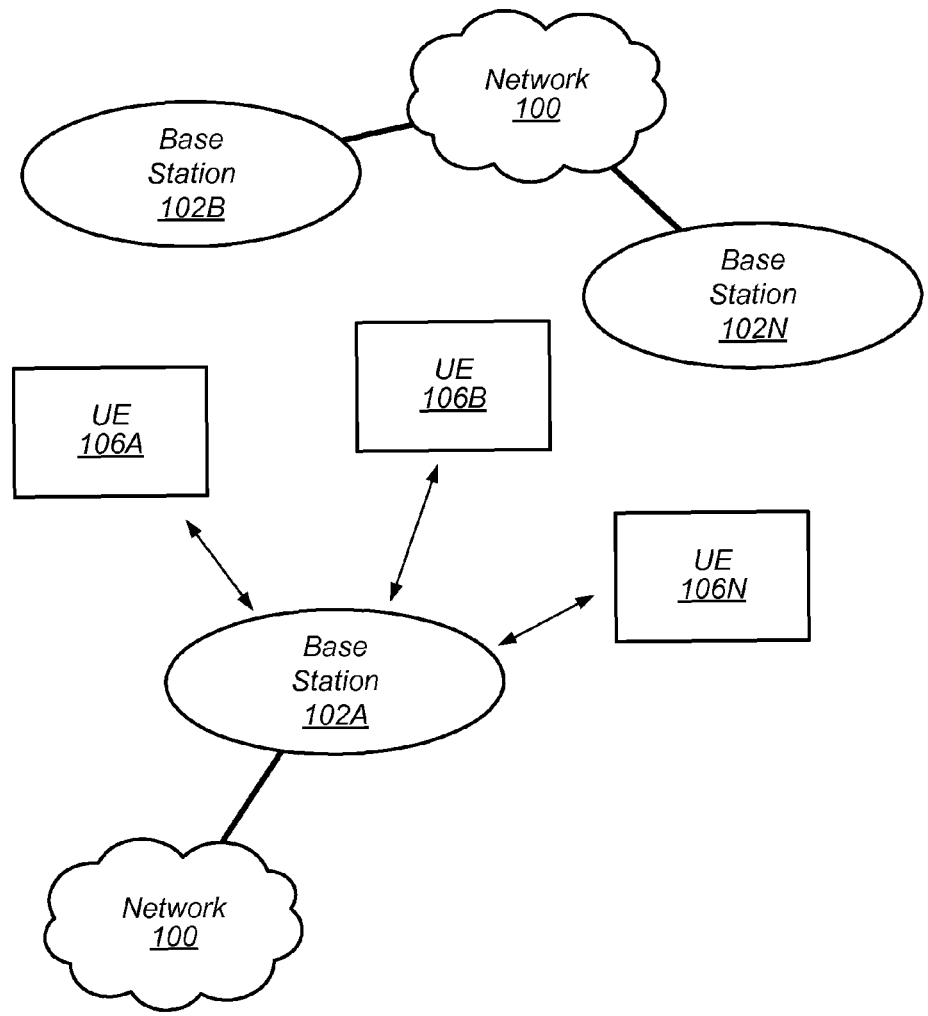
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
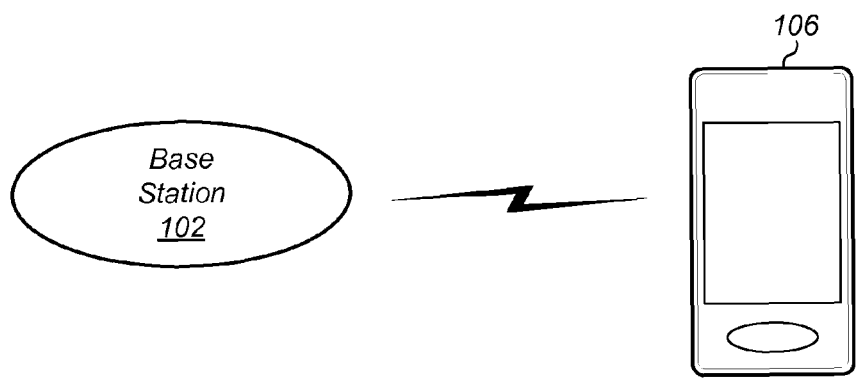
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE and 1×RTT (or LTE and GSM), and separate radios for communicating using each of Wi-Fi and Bluetooth. Other configurations are also possible.

Figure 3:
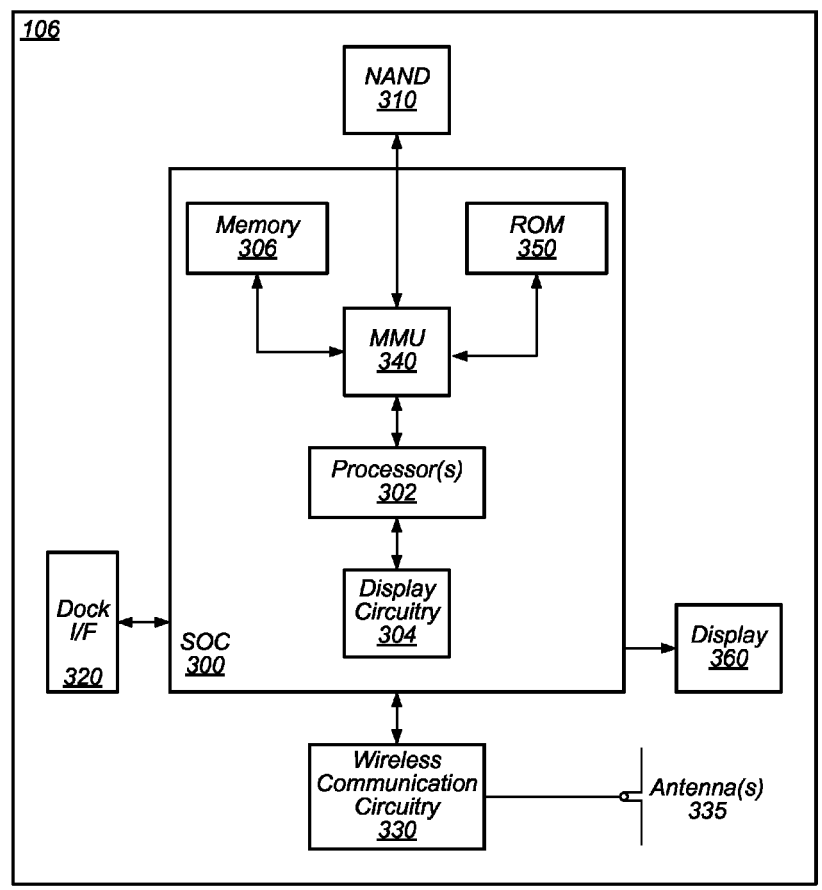
FIG. 3 illustrates an example block diagram of a UE according to some embodiments.

FIG. 3—Block Diagram of a UE

FIG. 3 illustrates an example block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As noted above, the UE 106 may be configured to communicate wirelessly using multiple wireless communication technologies. As further noted above, in such instances, the wireless communication circuitry 330 may include radio components which are shared between multiple wireless communication technologies and/or radio components which are configured exclusively for use according to a single wireless communication technology. As shown, the UE 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As shown, the UE 106 may also include or be coupled to a SIM (Subscriber Identity Module) 370. The SIM 370 may be implemented as an application on a smart card, in some embodiments. The smart card may itself be referred to as a SIM card in some cases. As one example, the SIM 370 may be an application which executes on a Universal Integrated Circuit Card (UICC). The smart card may also include (e.g., store and/or execute) one or more other applications, if desired. The smart card may be removable.

Alternatively, the SIM 370 may be implemented as an embedded SIM (eSIM). In this case, the SIM 370 may be implemented in device hardware and/or software. For example, in some embodiments, the UE 106 may include an embedded UICC (eUICC), e.g., a device which is built into the UE 106 and is not removable. The eUICC may be programmable, such that an eSIM may be implemented on the eUICC. In other embodiments, the eSIM may be installed in UE 106 software, e.g., as program instructions stored on a memory medium (such as memory 306 or NAND 310) executing on a processor (such as processor 302) in the UE 106.

In some embodiments, the UE 106 may be a multi-SIM device, or may at least be multi-SIM capable. Each SIM of such a UE 106 may be implemented in any of various ways, including as a removable SIM or as an embedded SIM, among various possibilities. Dual SIM dual standby (DSDS) and dual SIM dual active (DSDA) are two examples of possible multi-SIM configurations which may be implemented by a UE 106, according to various embodiments.

The subscriber identity information may be used to identify the UE 106 to its subscriber's carrier cellular network. The subscriber identity may also be used outside of the "home" area in which the subscriber's carrier provides cellular service in some situations, for example if the subscriber's carrier has arranged any roaming agreements with other network operators so that the visited network will recognize the subscriber identity information and allow access to the network.

Note that the area in which a subscriber identity may be used to obtain cellular service via the carrier with which the subscriber identity is associated may be considered a "local service area" for the subscriber identity, in which locations the subscriber identity may be considered "local". In other words, as used herein, a UE 106 may be considered able to obtain "local service" in a location using a subscriber identity if the carrier associated with (e.g., which provided) the subscriber identity provides cellular service in that location.

Any areas in which the subscriber identity may be used to obtain cellular service via another carrier than that with which the subscriber identity is associated (e.g., via one or more roaming agreements) may be considered a "roaming service area" for the subscriber identity. In other words, as used herein, a UE 106 may be considered able to obtain "roaming service" in a location using a subscriber identity if carrier with which a roaming agreement has been negotiated by the carrier associated with the subscriber identity provides cellular service in that location.

Any areas in which the subscriber identity may not be used to obtain cellular service via the carrier with which the subscriber identity is associated or any other may be considered a "no service area" for the subscriber identity. In other words, as used herein, a UE 106 may be considered able to obtain "no service" in a location using a subscriber identity if neither the carrier associated with the subscriber identity nor any other carrier with which a roaming agreement has been negotiated by the carrier associated with the subscriber identity provides cellular service in that location. Note that cellular service may still be available (for example using a different subscriber identity associated with a local carrier) in locations for which no service is available using a particular subscriber identity, though it is also possible that no cellular service may be available at all in some (e.g., remote) locations.

As described herein, the UE 106 may include hardware and software components for implementing part or all of the methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
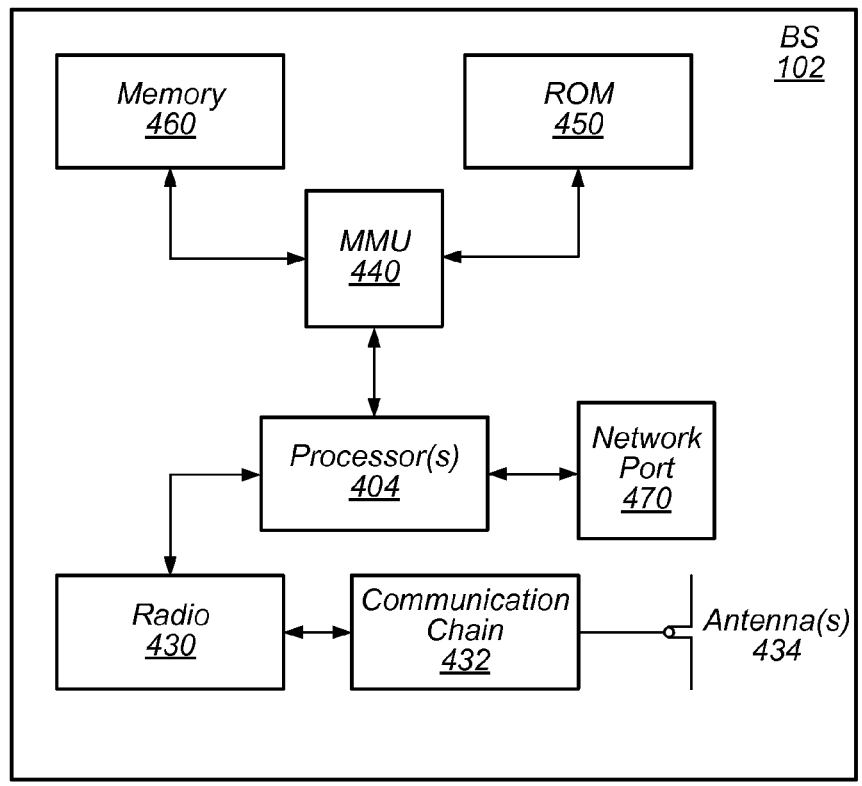
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

FIGS. 5-9—Flowchart Diagrams

As previously noted, in some scenarios a wireless device may be capable of utilizing multiple subscriber identity modules (SIMs). For example, dual SIM support may enable a device to be simultaneously registered with two SIMs, potentially on two different networks. Dual SIM support may include dual SIM dual standby (DSDS) support, in which a device may be simultaneously registered with two SIMs but may actively communicate with one of the networks at a time (e.g., using a shared radio), or dual SIM dual active (DSDA) support, in which a device may be simultaneously registered with two SIMs and may simultaneously actively communicate two networks at a time, among various dual SIM configurations.

Dual SIM support may be implemented in any of various ways, as desired. For example, a wireless device may provide dual SIM functionality only when the device is in a roaming state, or only when the device is registered with a home network, or both when the device is roaming and when the device is registered with a home network, among various possibilities. As another example, when dual SIM functionality is implemented different SIMs may have different availabilities with respect to voice and data communication. Thus as one possibility, a primary SIM (e.g., corresponding to a first subscription) might be made available for voice communication, while a secondary SIM (e.g., corresponding to a second subscription) might be made available for data communication. Alternate arrangements (e.g., primary SIM available for data, secondary SIM available for voice; both primary and secondary SIMs available for both voice and data; both primary and secondary SIMs available for voice only or for data only, etc.) are also possible. As a still further example, when dual SIM functionality is implemented, different SIMs may have different availabilities with respect to different radio access technologies (RATs); for example, one or more RATs available to one SIM might not be available to the other SIM (and/or vice versa), and/or one or both SIMs might have different RAT availability depending on whether the wireless device is operating in a dual SIM mode or a single SIM mode. As one possible configuration, a SIM might be configured to use any of GSM, WCDMA, and/or LTE for voice and/or data communications when operating in a single SIM mode, and might be configured with the same capabilities or only a subset of those capabilities (e.g., voice only and GSM only, as one possibility) when operating in a dual SIM mode. Numerous other configurations are also possible and should be considered within the scope of this disclosure.

Note also that in some instances, the specific configuration of a dual SIM capable wireless device at a particular time may result from any combination of hardware and/or software features of the wireless device, subscription characteristics of the SIMs used with the wireless device, and/or user preference(s), among various possible considerations and/or constraints.

While it may be possible to operate each SIM entirely independently, in at least some instances, it may be beneficial to share data and/or operations between SIMs under certain circumstances. The optimal manner and circumstances under which to implement such data and/or operation sharing may depend on the configuration of a given wireless device. In many instances, however, it may be the case that such data and/or operation sharing may reduce device power consumption and/or improve user experience, e.g., in comparison to operating each SIM independently of each other SIM of a multi-SIM capable wireless device.

As one possible example of a scenario in which it may be beneficial to share information between SIMs of a wireless device, in at least some instances it may be possible to reduce the time until obtaining service when performing system selection by sharing information between SIMs of a wireless device (e.g., a UE such as UE 106 illustrated in and described with respect to FIGS. 1-3). FIGS. 5-9 are flowchart diagrams illustrating example methods that may be performed by a multi-SIM capable UE to perform system selection under various circumstances.

Figure 5:
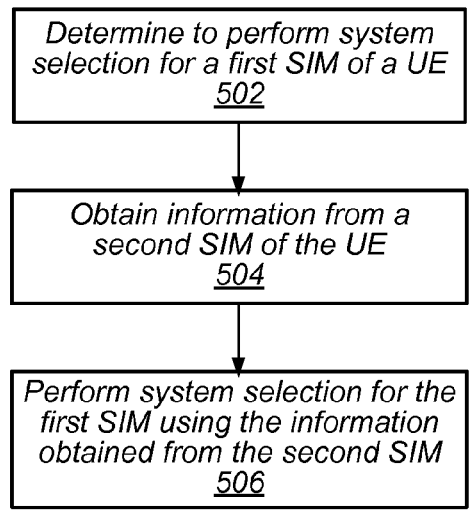
FIGS. 5-9 are flowchart diagrams illustrating example methods by which a multi-SIM capable UE may perform system selection, according to some embodiments.

The method shown in FIG. 5 may be used in conjunction with any of the computer systems or devices shown in the above Figures, among other devices. This method may be used in various types of cellular communication systems across any of a variety of cellular technologies. In various embodiments, some of the elements of the scheme shown may be performed concurrently, in a different order than shown, or may be omitted. Additional and/or alternative elements may also be performed as desired. As shown, the method of FIG. 5 may operate as follows.

In 502, it may be determined to perform system selection for a first SIM of a UE. System selection may include any or all of attempting to discover a suitable cellular system (e.g., cell) from which to obtain cellular service, attempting to obtain system information for such a cellular system if discovered, and/or registering for cellular service with such a cellular system.

System selection may be performed on any of various possible occasions, including, but not limited to, initial system selection (e.g., upon powering the UE on or transitioning out of an "airplane mode" in which at least a cellular radio of the UE is powered off), transitioning between dual SIM mode and single SIM mode (e.g., either from dual SIM mode to single SIM mode, or from single SIM mode to dual SIM mode), or if a SIM goes out-of-service. Thus, according to some embodiments, the determination to perform system selection may be based upon determining that any of the above conditions (or any other configured conditions) for performing system selection are present.

As noted above, the UE may be a multi-SIM capable UE. Thus, at least in some instances, the UE may include at least a second SIM in addition to the first SIM. The UE may be capable of operating in a dual SIM mode (e.g., in which both the first SIM and teh second SIM are active) or a single SIM mode (e.g., in which just the first SIM, or just the second SIM, is active). Such a dual SIM mode may be a dual SIM dual standby (DSDS) or dual SIM dual active (DSDA) mode, among various possibilities. Note that, in some instances, the first SIM and the second SIM may provide different services, e.g., at least when in dual SIM mode. For example, it may be the case that when in dual SIM mode the first SIM provides voice services and the second SIM provides data services. As will be readily recognized, other arrangements are also possible.

The UE may operate in different modes at different times. The UE may determine in which mode to operate at a particular time in any of various possible ways. For example, as one possibility, the UE may preferably operate in a single SIM mode when in a local service area and in a dual SIM mode when in a roaming service area. As another possibility, the UE may preferably operate in a dual SIM mode if service is available for each SIM, but fall back to a single SIM mode if service is only available for one SIM.

In some instances, the UE may determine in which mode to operate based at least in part on whether one or more alternate network interfaces are available. For example, while in some instances one or more SIMs of the UE may be capable of providing cellular data services, it may also be the case that the UE may include one or more other network interfaces by which data services may be provided, such as Wi-Fi. Since in many cases Wi-Fi data may be a preferred option for obtaining data services (e.g., due to cost considerations), in some embodiments the UE may choose not to use a SIM which provides a data subscription at times when Wi-Fi data access is available. For example, a UE might determine whether Wi-Fi (or another network interface providing data access) service is available to the UE, and transition to (or remain in) single SIM mode from dual SIM mode based at least in part on determining that the UE does have Wi-Fi service. For example, as one possibility, if a secondary SIM provides a data subscription and a primary SIM provides a voice subscription, when Wi-Fi is available, it may be determined to operate in a single SIM mode using the primary SIM (e.g., to provide cellular voice service). Thus, this may be one example of a possible scenario in which a transition between dual SIM and single SIM mode might occur, which might in turn trigger system selection for a SIM of the UE. Note that other scenarios in which availability of an alternate network interface (such as Wi-Fi) may be used to determine whether to operate in a single SIM mode or a dual SIM mode are also possible.

In 504, information may be obtained from a second SIM of the UE. The information from the second SIM may include serving cell and/or neighboring cell information from the second SIM. The neighboring cell information may include any of various possible types of information. As some examples, the serving and/or neighboring cell information may include any or all of a RAT, an absolute radio frequency channel number (ARFCN) or enhanced ARFCN (EARFCN, e.g., for LTE cells), signal strength information, a PLMN, and/or any of various other types of information, for each of one or more serving or neighboring cells for the second SIM.

In 506, system selection may be performed for the first SIM. The system selection process for the first SIM may include the use of (e.g., be based at least in part on) the information obtained from the second SIM.

For example, as one possibility, one or more targeted searches for some or all of the cells for which information is obtained from the second SIM may be performed. In such a case, the ARFCN (or EARFCN) of each of one or more targeted cells may be scanned to determine if a system is present at each scanned frequency, and (at least in some instances) an attempt to acquire system information may be performed on one or more such targeted cells (e.g., if the frequency scan indicates a likely presence of such targeted cells).

In some embodiments, such a targeted search may further be prioritized such that the one or more targeted cells are searched in a preferred order. The order in which the targeted cells are searched may be influenced by any of various possible considerations, such as a RAT according to which each targeted cell operates, a PLMN to which each cell belongs, cell signal strengths, and/or various other possible considerations. The manner in which the RAT, PLMN, etc. affects the preferred search order may depend upon the subscription agreement(s) provided by the first and second SIM, the hardware and/or software configuration of the UE, user preferences, a current mode (e.g., dual SIM or single SIM) of the UE, and/or any of various other factors.

In some instances, in addition to or instead of prioritizing the search order of such a targeted search, one or more cells for which cell information from the second SIM is available form the second SIM may be excluded from such a targeted search. For example, as previously noted, the different SIMs of a multi-SIM capable wireless device may in some instances have different availabilities with respect to different RATs, and/or a RAT may be available for a given SIM of a wireless device while the SIM is in single SIM mode but not while the SIM is in dual- or multi-SIM mode. Likewise, different SIMs may have different PLMN permissions according to their subscription agreements. Thus, it might be the case that if any of the cells for which cell information from the second SIM is available belong to a PLMN which the first SIM is barred from accessing, or operate according to a RAT which is not available to the first SIM, such cells might be excluded from the targeted search.

If no suitable cell is found based on such a targeted search, the wireless device may perform a broader cell search. Such a cell search may include searching one or more recently used frequency channels and/or one or more frequency bands on which a cell from which service for the first SIM may be obtained. The frequency channels and/or bands searched during such a cell search may (at least in some instances) be selected based at least in part on a location of the wireless device (e.g., the cell search may be a location based cell search); for example, the band(s) selected on which to perform the cell search may include one or more bands on which one or more cell are known to be deployed in a particular location (e.g., country, mobile country code identified with a country, or any other location identifier) in which the wireless device is located.

At least in some instances, if a suitable cell is found based on a targeted cell search using information from the second SIM, or based on a broader cell search, the UE may register with the PLMN that provides the cell, and the system selection process may be complete.

If the attempted system selection process is unsuccessful (e.g., if no suitable cell is found), the first SIM may become (or continue to be) out-of-service. According to some embodiments, in such a scenario the first SIM may be placed into a low-power "sleep" mode, and the second SIM may continue searching (e.g., periodically, between its own sleep cycles and/or other operations on its own behalf) for service for the first SIM. In such a case, the first SIM may be activated/woken up if service information that is potentially usable by the first SIM is found.

Note that while the FIG. 5 and the corresponding description thereof provided herein above provides a method by which system selection for a first SIM of a UE is informed by cell information obtained from a second SIM of the UE, any of the techniques illustrated in and described with respect to FIG. 5 may be performed with the roles of the first SIM and the second SIM reversed, if desired. Thus, system selection for the second SIM (e.g., as might be triggered by any of various possible reasons similar to those described as possibly triggering system selection for the first SIM) may be informed by cell information obtained from the first SIM of the UE, according to any of the various embodiments described herein.

Thus, it may be possible to share information between the SIMs of a multi-SIM capable UE as part of the system selection process for either or both SIMs. Such techniques may result in more rapid system acquisition than if the SIMs operated independently of one another with respect to system selection, as the cell information available from one SIM may allow the other SIM to perform a targeted search for cells from which the SIM for which system selection is being performed may have a high likelihood of obtaining service.

Such information sharing may be particularly advantageous in scenarios in which one of the SIMs may have cell information which is not already available to the other SIM. For example, if a UE transitions from single SIM mode to dual SIM mode, serving cell and/or neighboring cell information from the SIM which was previously active may be used by the newly active SIM to potentially very quickly obtain service from a cell for which cell information was obtained from the other SIM.

As another example, consider a possible scenario in which one or more RATs are not available using the first SIM in the dual SIM mode but are available using the first SIM in the dual SIM mode. Consider further if these RATs are available using the second SIM in the dual SIM mode. If, in such a scenario, the UE transitions from dual SIM mode to single SIM mode (with the first SIM as the active SIM), it may be possible to obtain serving cell and/or neighbor cell information for those RATs which are now available to the first SIM from the second SIM. This may allow the first SIM to more quickly obtain service on such a newly available RAT, e.g., if the first SIM is able to obtain service from one of the cells for which cell information was obtained from the second SIM.

The methods of FIGS. 6-9 may be illustrative of system selection algorithms that may be used with a UE for which dual SIM functionality is available when in a roaming state. According to this dual SIM functionality, the first SIM, representing a first subscription, is available for voice services using GSM (also referred to as "G" for simplicity with respect to FIGS. 6-9), and the second SIM, representing a second subscription, is available for data services using GSM, WCDMA (also referred to as "W" for simplicity with respect to FIGS. 6-9), and LTE. Furthermore, in this particular scenario, the first SIM may be available for voice services using GSM or WCDMA when operating in single SIM mode. At least in some instances, the first SIM may also be available for data services using GSM, WCDMA, and/or LTE when operating in single SIM mode. As previously noted, any number of alternate implementations (e.g., in which voice services using LTE also available for the first SIM in single SIM mode, and/or in which WCDMA and/or LTE services (for voice and/or data) are available for the first SIM in dual SIM mode, among various possibilities) are also possible.

Note that FIGS. 6-9 and the information provided herein below in conjunction therewith are provided by way of example of various considerations and details relating to possible systems with which the method of FIG. 5 may be implemented, and are not intended to be limiting to the disclosure as a whole. Numerous variations and alternatives to the details provided herein below are possible and should be considered within the scope of the disclosure.

Figure 6A:
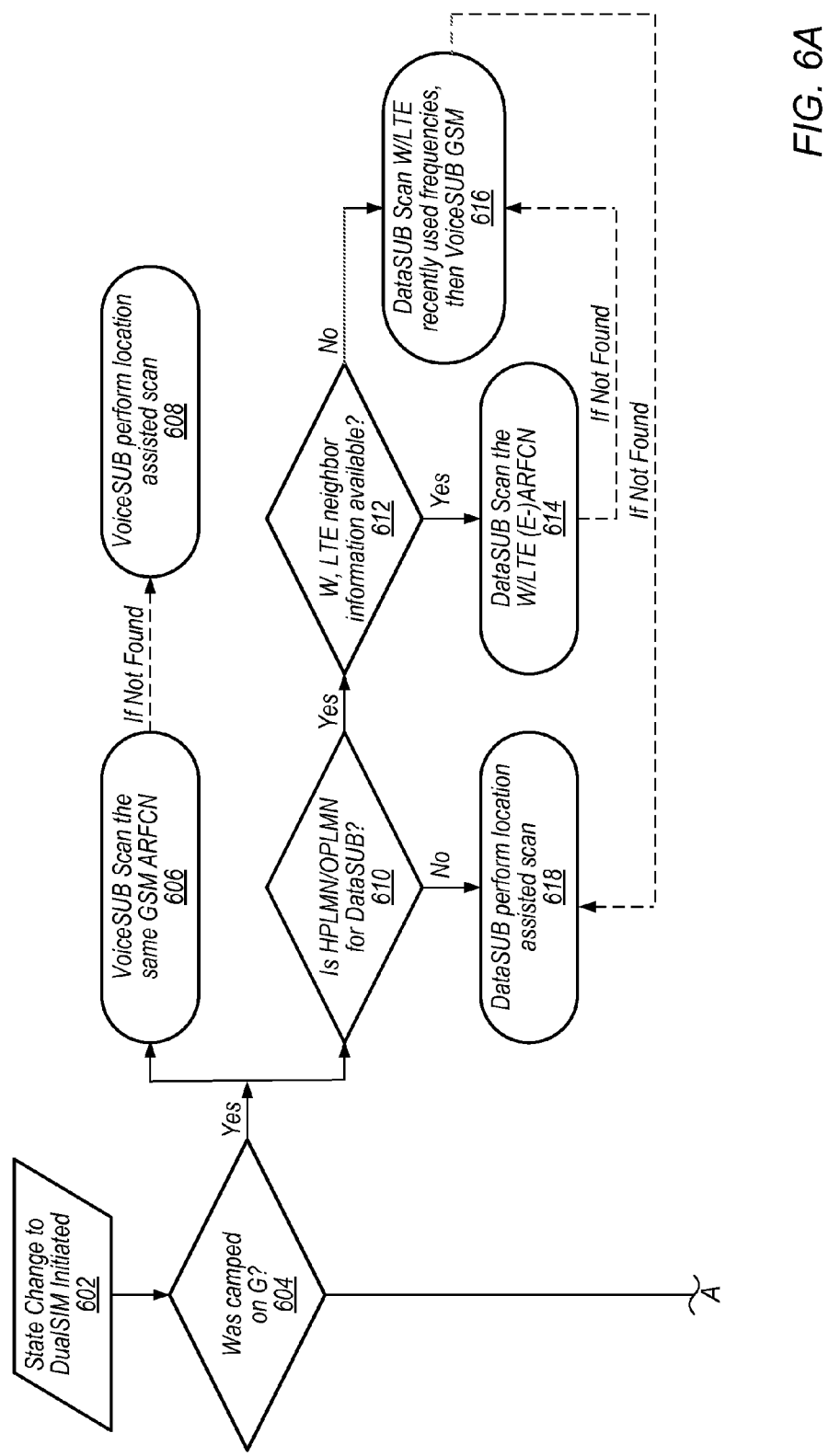
Figure 6C:
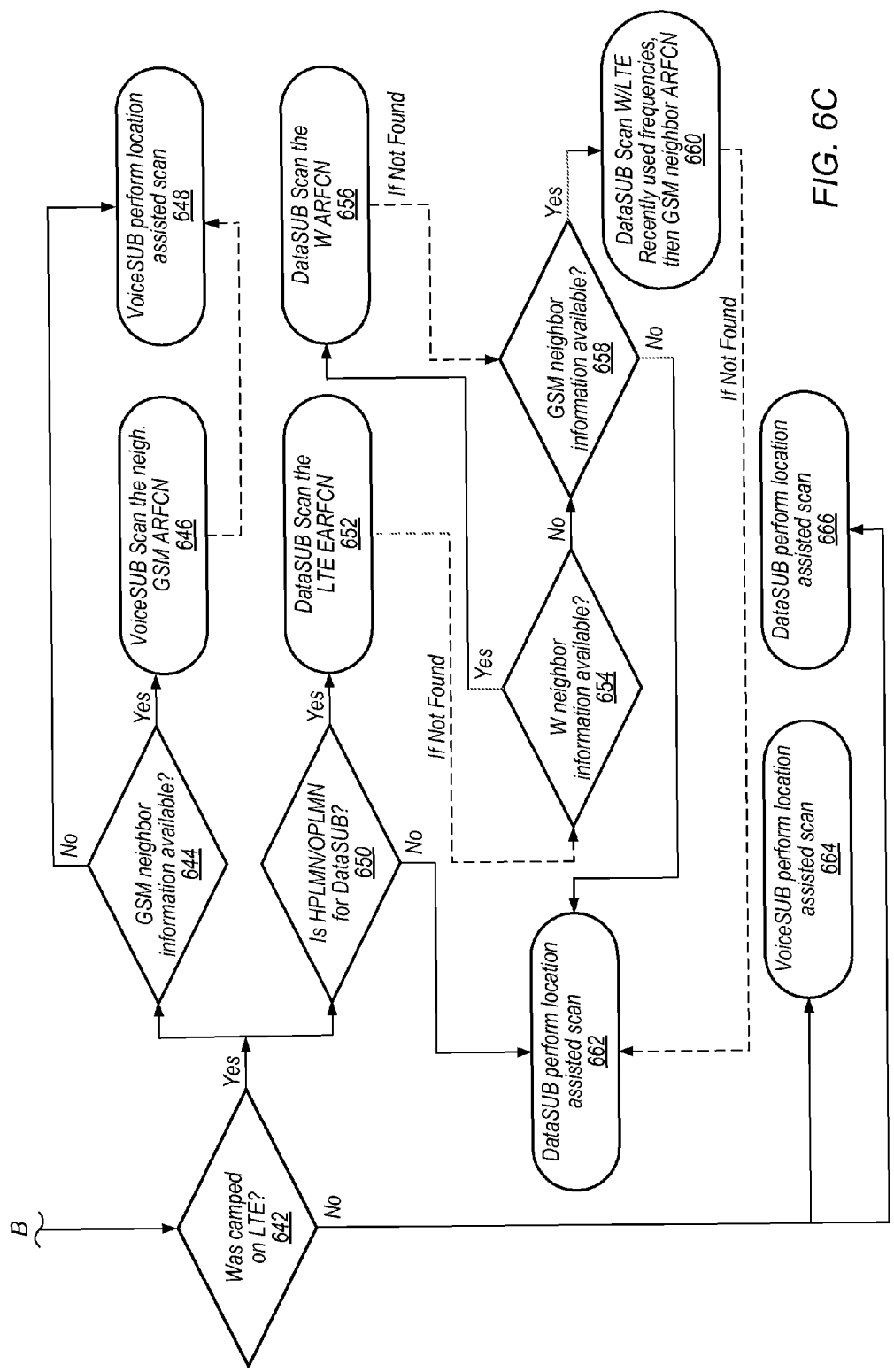

FIGS. 6A-6C are a flowchart diagram illustrating an example method that may be performed by a dual SIM UE to perform system selection in a scenario in which the UE is transitioning from a single SIM mode to a dual SIM mode. As shown, the method of FIG. 6 may operate as follows.

In 602, a state change from a single SIM mode (e.g., in which the primary SIM or "voiceSUB" is active, or possibly alternatively in which the secondary SIM or "dataSUB" is active) to a dual SIM mode (e.g., in which both the voiceSUB and the dataSUB are active) may be initiated.

In 604, it may be determined if the SIM that was active in the single SIM mode was camped on a GSM cell.

In 606, if the SIM that was active in the single SIM mode was camped on a GSM cell, the voiceSUB may scan the GSM ARFCN. If the cell on which the SIM that was active in the single SIM mode was camped on is found, the voiceSUB may camp on that cell.

In 608, if the cell on which the SIM that was active in the single SIM mode was camped on is not found, the voiceSUB may perform a location assisted scan. If any cells are found as a result of such scanning, the voiceSUB may camp on such a cell. If no cells are found as a result of such scanning, the voiceSUB may be out-of-service.

Note that (e.g., according to an alternate implementation) if the voiceSUB were configured to utilize WCDMA, LTE and/or any other RATs in addition to GSM when in dual SIM mode, one or more additional steps (e.g., similar to those described herein with regard to system selection for the dataSUB) might be performed for the voiceSUB prior to performing a location assisted scan. For example, the voiceSUB might scan for WCDMA and/or LTE cells based on information from either or both of the voiceSUB or the dataSUB, in addition to scanning for GSM cells, and camp on such a cell if found.

In 610, also if the SIM that was active in the single SIM mode was camped on a GSM cell, it may be determined if the PLMN of the previously camped on GSM cell is a HPLMN or OPLMN of the dataSUB.

In 612, if the PLMN of the previously camped on GSM cell is a HPLMN or OPLMN of the dataSUB, it may be determined if WCDMA and/or LTE neighbor info is available.

In 614, if WCDMA and/or LTE neighbor info is available, the dataSUB may scan the WCDMA ARFCNs and/or LTE EARFCNs. If any WCDMA or LTE cells are found as a result of such scanning, the dataSUB may camp on such a cell.

In 616, if no WCDMA or LTE cells are found as a result of such scanning, or if no WCDMA or LTE neighbor info is available, the dataSUB may scan any recently used WCDMA or LTE frequencies, then the voiceSUB GSM ARFCN. If any cells are found as a result of such scanning, the dataSUB may camp on such a cell.

In 618, if no cells are found as a result of such scanning, or if the PLMN of the previously camped on GSM cell is not a HPLMN or OPLMN of the dataSUB, the dataSUB may perform a location assisted scan. If any cells are found as a result of such scanning, the dataSUB may camp on such a cell. If no cells are found as a result of such scanning, the dataSUB may be out-of-service.

In 620, if the SIM that was active in the single SIM mode was not camped on a GSM cell, it may be determined if the SIM that was active in the single SIM mode was camped on a WCDMA cell.

In 622, if the SIM that was active in the single SIM mode was camped on a WCDMA cell, it may be determined if GSM neighbor info is available.

In 624, if GSM neighbor info is available, the voiceSUB may scan the GSM neighbor ARFCN(s). If any cells are found as a result of such scanning, the voiceSUB may camp on such a cell.

In 626, if no cells are found as a result of such scanning, or if no GSM neighbor info is available, the voiceSUB may perform a location assisted scan. If any cells are found as a result of such scanning, the voiceSUB may camp on such a cell. If no cells are found as a result of such scanning, the voiceSUB may be out-of-service.

Note again that (e.g., according to an alternate implementation) if the voiceSUB were configured to utilize WCDMA, LTE and/or any other RATs in addition to GSM when in dual SIM mode, one or more additional steps (e.g., similar to those described herein with regard to system selection for the dataSUB) might be performed for the voiceSUB prior to performing a location assisted scan. For example, the voiceSUB might scan for WCDMA and/or LTE cells based on information from either or both of the voiceSUB or the dataSUB, in addition to scanning for GSM cells, and camp on such a cell if found.

In 628, also if the SIM that was active in the single SIM mode was camped on a WCDMA cell, it may be determined if the PLMN of the previously camped on WCDMA cell is a HPLMN or OPLMN of the dataSUB.

In 630, if the PLMN of the previously camped on WCDMA cell is a HPLMN or OPLMN of the dataSUB, the dataSUB may scan the WCDMA cell ARFCN. If the cell on which the SIM that was active in the single SIM mode was camped on is found, the dataSUB may camp on that cell.

In 632, if cell on which the SIM that was active in the single SIM mode was camped on is not found, it may be determined if LTE neighbor info is available.

In 634, if LTE neighbor info is available, the dataSUB may scan the LTE EARFCN(s) for which LTE neighbor info is available. If any LTE cells are found as a result of such scanning, the dataSUB may camp on such a cell.

In 636, if no LTE cells are found as a result of such scanning, or if no LTE neighbor info is available, it may be determined if GSM neighbor info is available.

In 638, if GSM neighbor info is available, the dataSUB may scan any recently used WCDMA or LTE frequencies, then the GSM neighbor ARFCN(s). If any cells are found as a result of such scanning, the dataSUB may camp on such a cell.

In 640, if no cells are found as a result of such scanning, or if no GSM neighbor info is available, or if the PLMN of the previously camped on WCDMA cell is not a HPLMN or OPLMN of the dataSUB, the dataSUB may perform a location assisted scan. If any cells are found as a result of such scanning, the dataSUB may camp on such a cell. If no cells are found as a result of such scanning, the dataSUB may be out-of-service.

In 642, if the SIM that was active in the single SIM mode was not camped on a WCDMA cell, it may be determined if the SIM that was active in the single SIM mode was camped on a LTE cell.

In 644, if the SIM that was active in the single SIM mode was camped on a LTE cell, it may be determined if GSM neighbor info is available.

In 646, if GSM neighbor info is available, the voiceSUB may scan the GSM neighbor ARFCN(s). If any cells are found as a result of such scanning, the voiceSUB may camp on such a cell.

In 648, if no cells are found as a result of such scanning, or if no GSM neighbor info is available, the voiceSUB may perform a location assisted scan. If any cells are found as a result of such scanning, the voiceSUB may camp on such a cell. If no cells are found as a result of such scanning, the voiceSUB may be out-of-service.

Note again that (e.g., according to an alternate implementation) if the voiceSUB were configured to utilize WCDMA, LTE and/or any other RATs in addition to GSM when in dual SIM mode, one or more additional steps (e.g., similar to those described herein with regard to system selection for the dataSUB) might be performed for the voiceSUB prior to performing a location assisted scan. For example, the voiceSUB might scan for WCDMA and/or LTE cells based on information from either or both of the voiceSUB or the dataSUB, in addition to scanning for GSM cells, and camp on such a cell if found.

In 650, also if the SIM that was active in the single SIM mode was camped on a LTE cell, it may be determined if the PLMN of the previously camped on LTE cell is a HPLMN or OPLMN of the dataSUB.

In 652, if the PLMN of the previously camped on WCDMA cell is a HPLMN or OPLMN of the dataSUB, the dataSUB may scan the LTE cell EARFCN. If the cell on which the SIM that was active in the single SIM mode was camped on is found, the dataSUB may camp on that cell.

In 654, if cell on which the SIM that was active in the single SIM mode was camped on is not found, it may be determined if WCDMA neighbor info is available.

In 656, if WCDMA neighbor info is available, the dataSUB may scan the WCDMA ARFCN(s) for which WCDMA neighbor info is available. If any WCDMA cells are found as a result of such scanning, the dataSUB may camp on such a cell.

In 658, if no WCDMA cells are found as a result of such scanning, or if no WCDMA neighbor info is available, it may be determined if GSM neighbor info is available.

In 660, if GSM neighbor info is available, the dataSUB may scan any recently used WCDMA or LTE frequencies, then the GSM neighbor ARFCN(s). If any cells are found as a result of such scanning, the dataSUB may camp on such a cell.

In 662, if no cells are found as a result of such scanning, or if no GSM neighbor info is available, or if the PLMN of the previously camped on LTE cell is not a HPLMN or OPLMN of the dataSUB, the dataSUB may perform a location assisted scan. If any cells are found as a result of such scanning, the dataSUB may camp on such a cell. If no cells are found as a result of such scanning, the dataSUB may be out-of-service.

In 664, if the SIM that was active in the single SIM mode was not camped on a LTE cell, the voiceSUB may perform a location assisted scan. If any cells are found as a result of such scanning, the voiceSUB may camp on such a cell. If no cells are found as a result of such scanning, the voiceSUB may be out-of-service.

In 666, also if the SIM that was active in the single SIM mode was not camped on a LTE cell, the dataSUB may perform a location assisted scan. If any cells are found as a result of such scanning, the dataSUB may camp on such a cell. If no cells are found as a result of such scanning, the dataSUB may be out-of-service.

Figure 7A:
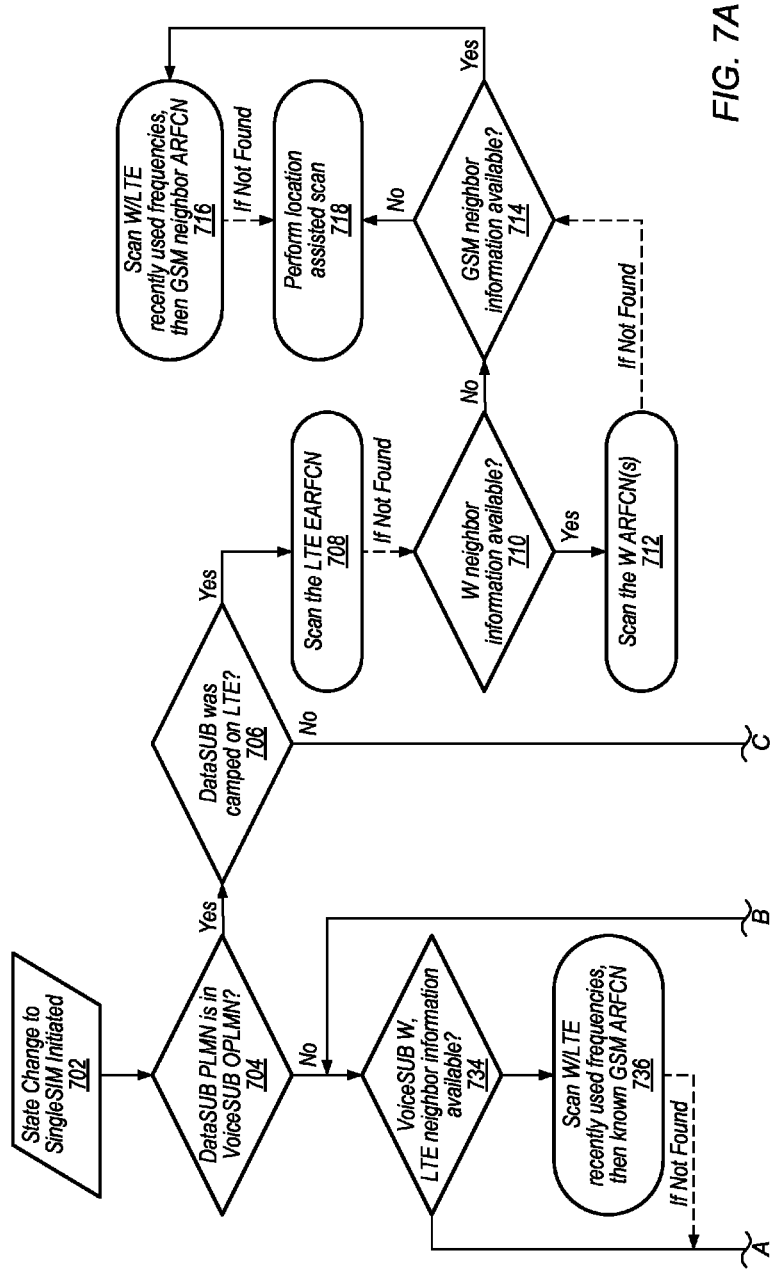
Figure 7B:
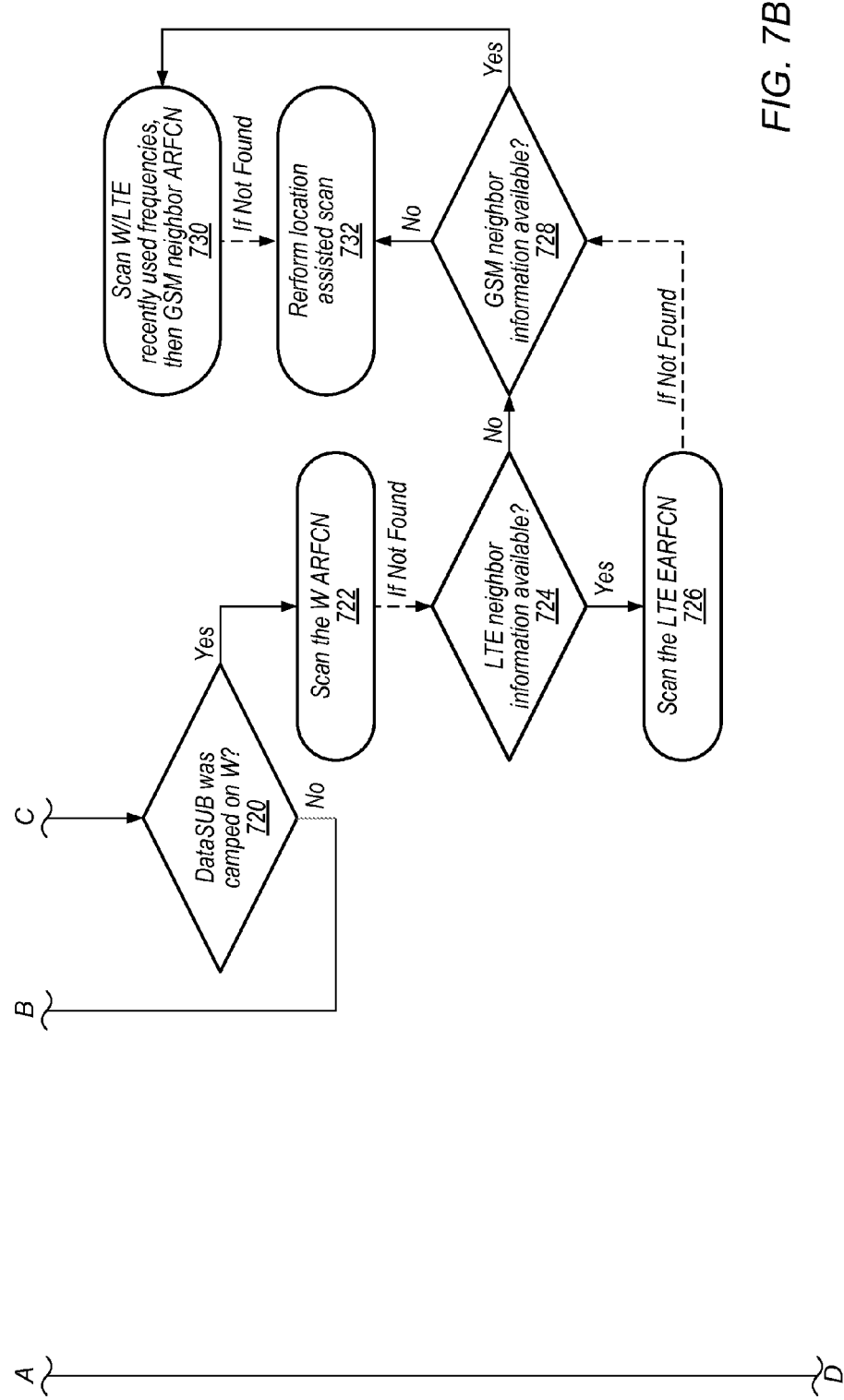
Figure 7C:
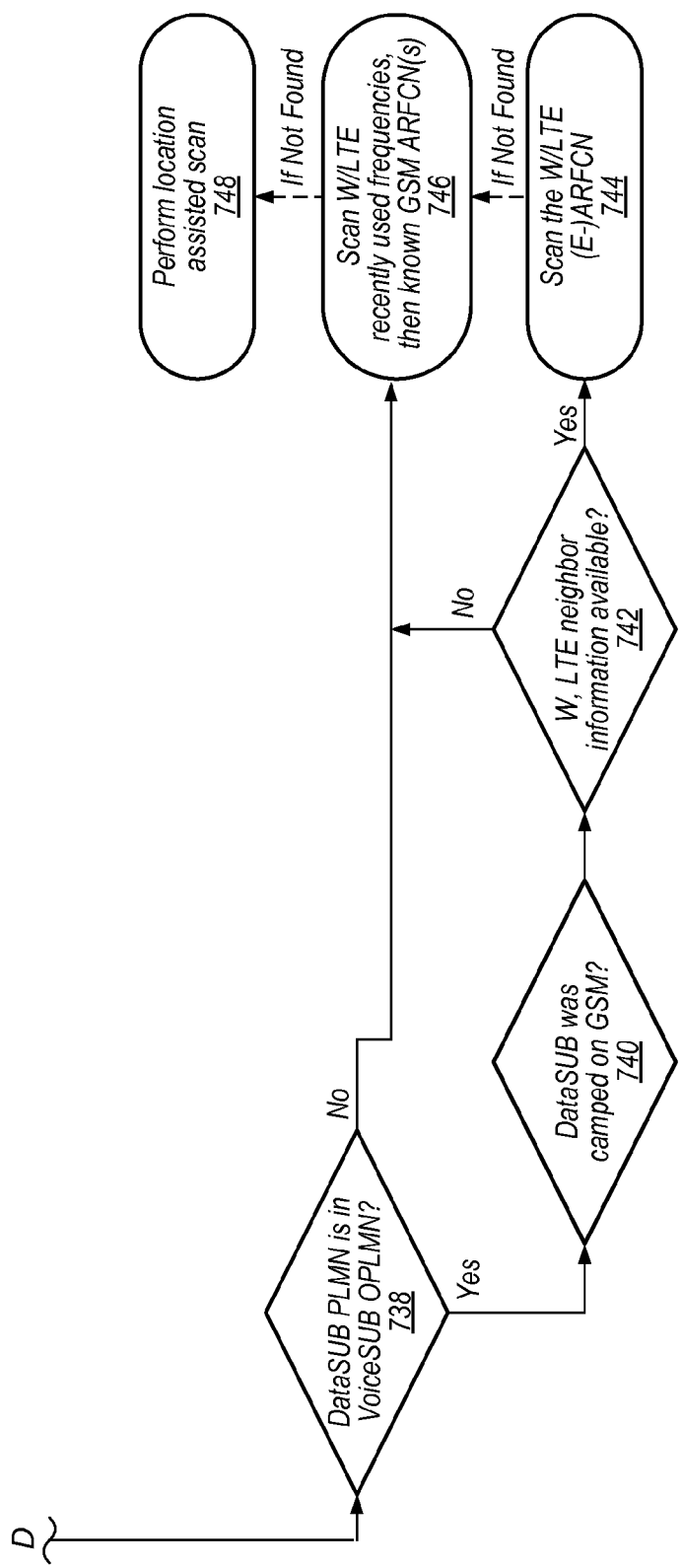

FIGS. 7A-7C are a flowchart diagram illustrating an example method that may be performed by a dual SIM UE to perform system selection in a scenario in which the UE is transitioning from a dual SIM mode to a single SIM mode. As shown, the method of FIGS. 7A-7C may operate as follows.

In 702, a state change from a dual SIM mode to a single SIM mode may be initiated. In the dual SIM mode the voiceSUB and the dataSUB may have both been active, while in the single SIM mode only the voiceSUB (or possibly alternatively only the dataSUB) may be active.

In 704, it may be determined if the dataSUB PLMN is in the voiceSUB OPLMN list.

In 706, if the dataSUB PLMN is in the voiceSUB OPLMN list, it may be determined if the dataSUB was camped on an LTE cell.

In 708, if the dataSUB was camped on an LTE cell, the voiceSUB may scan the EARFCN of the LTE cell on which the dataSUB was camped. If found, the voiceSUB may camp on the cell previously camped on by the dataSUB.

In 710, if the cell previously camped on by the dataSUB is not found, it may be determined if WCDMA neighbor info from the dataSUB is available.

In 712, if WCDMA neighbor info is available, the voiceSUB may scan the ARFCN(s) of the WCDMA cell(s) for which WCDMA neighbor info is available. If any cells are found as a result of such scanning, the voiceSUB may camp on such a cell.

In 714, if no cells are found as a result of such scanning, or if no WCDMA neighbor info is available, it may be determined if GSM neighbor info from the dataSUB is available.

In 716, if GSM neighbor info is available, the voiceSUB may scan any recently used WCDMA or LTE frequencies, then the GSM neighbor ARFCN(s). If any cells are found as a result of such scanning, the voiceSUB may camp on such a cell.

In 718, if no cells are found as a result of such scanning, or if no GSM neighbor info is available, the voiceSUB may perform a location assisted scan. If any cells are found as a result of such scanning, the voiceSUB may camp on such a cell. If no cells are found as a result of such scanning, the voiceSUB may be out-of-service.

In 720, if the dataSUB was not camped on an LTE cell, it may be determined if the dataSUB was camped on a WCDMA cell.

In 722, if the dataSUB was camped on an WCDMA cell, the voiceSUB may scan the ARFCN of the WCDMA cell on which the dataSUB was camped. If found, the voiceSUB may camp on the cell previously camped on by the dataSUB.

In 724, if the cell previously camped on by the dataSUB is not found, it may be determined if LTE neighbor info from the dataSUB is available.

In 726, if LTE neighbor info is available, the voiceSUB may scan the EARFCN(s) of the LTE cell(s) for which LTE neighbor info is available. If any cells are found as a result of such scanning, the voiceSUB may camp on such a cell.

In 728, if no cells are found as a result of such scanning, or if no LTE neighbor info is available, it may be determined if GSM neighbor info from the dataSUB is available.

In 730, if GSM neighbor info is available, the voiceSUB may scan any recently used WCDMA or LTE frequencies, then the GSM neighbor ARFCN(s). If any cells are found as a result of such scanning, the voiceSUB may camp on such a cell.

In 732, if no cells are found as a result of such scanning, or if no GSM neighbor info is available, the voiceSUB may perform a location assisted scan. If any cells are found as a result of such scanning, the voiceSUB may camp on such a cell. If no cells are found as a result of such scanning, the voiceSUB may be out-of-service.

In 734, if the dataSUB PLMN is not in the voiceSUB OPLMN list, or if the dataSUB PLMN is in the voiceSUB OPLMN list and the dataSUB was not camped on a WCDMA cell, it may be determined if WCDMA and/or LTE neighbor information is available from the voiceSUB.

In 736, if WCDMA and/or LTE neighbor information is available from the voiceSUB, the voiceSUB may scan any recently used WCDMA or LTE frequencies, then the known GSM ARFCN of a previous voiceSUB serving cell. If any cells are found as a result of such scanning, the voiceSUB may camp on such a cell.

In 738, if no cells are found as a result of such scanning, or if no WCDMA and/or LTE neighbor information is available from the voiceSUB, it may be determined if the dataSUB PLMN is not in the voiceSUB OPLMN list.

In 740, if the dataSUB PLMN is in the voiceSUB OPLMN list, it may be determined if the dataSUB was camped on a GSM cell.

In 742, if the dataSUB was camped on a GSM cell, it may be determined if WCDMA and/or LTE neighbor info from the dataSUB is available.

In 744, if WCDMA and/or LTE neighbor info from the dataSUB is available, the voiceSUB may scan the (E)ARFCN(s) of the WCDMA and/or LTE cell(s) for which WCDMA and/or LTE neighbor info is available. If any cells are found as a result of such scanning, the voiceSUB may camp on such a cell.

In 746, if no cells are found as a result of such scanning, or if no WCDMA and/or LTE neighbor info is available, or if the dataSUB PLMN is not in the voiceSUB OPLMN list, the voiceSUB may scan any recently used WCDMA or LTE frequencies, then any known GSM ARFCN(s). If any cells are found as a result of such scanning, the voiceSUB may camp on such a cell.

In 748, if no cells are found as a result of such scanning, the voiceSUB may perform a location assisted scan. If any cells are found as a result of such scanning, the voiceSUB may camp on such a cell. If no cells are found as a result of such scanning, the voiceSUB may be out-of-service.

Note that while FIG. 7 relates to a scenario in which a transition from dual SIM mode to single SIM mode in which the voiceSUB is the single SIM, steps similar to some or all of the aspects of the method of FIG. 7 could be applied in a transition from dual SIM mode to single SIM mode in which the dataSUB is the single SIM (e.g., with the roles of the voiceSUB and the dataSUB reversed as compared to the method of FIG. 7), for example in an alternate exemplary implementation in which GSM, WCDMA, and LTE are available to the voiceSIM in dual SIM mode.

Figure 8:
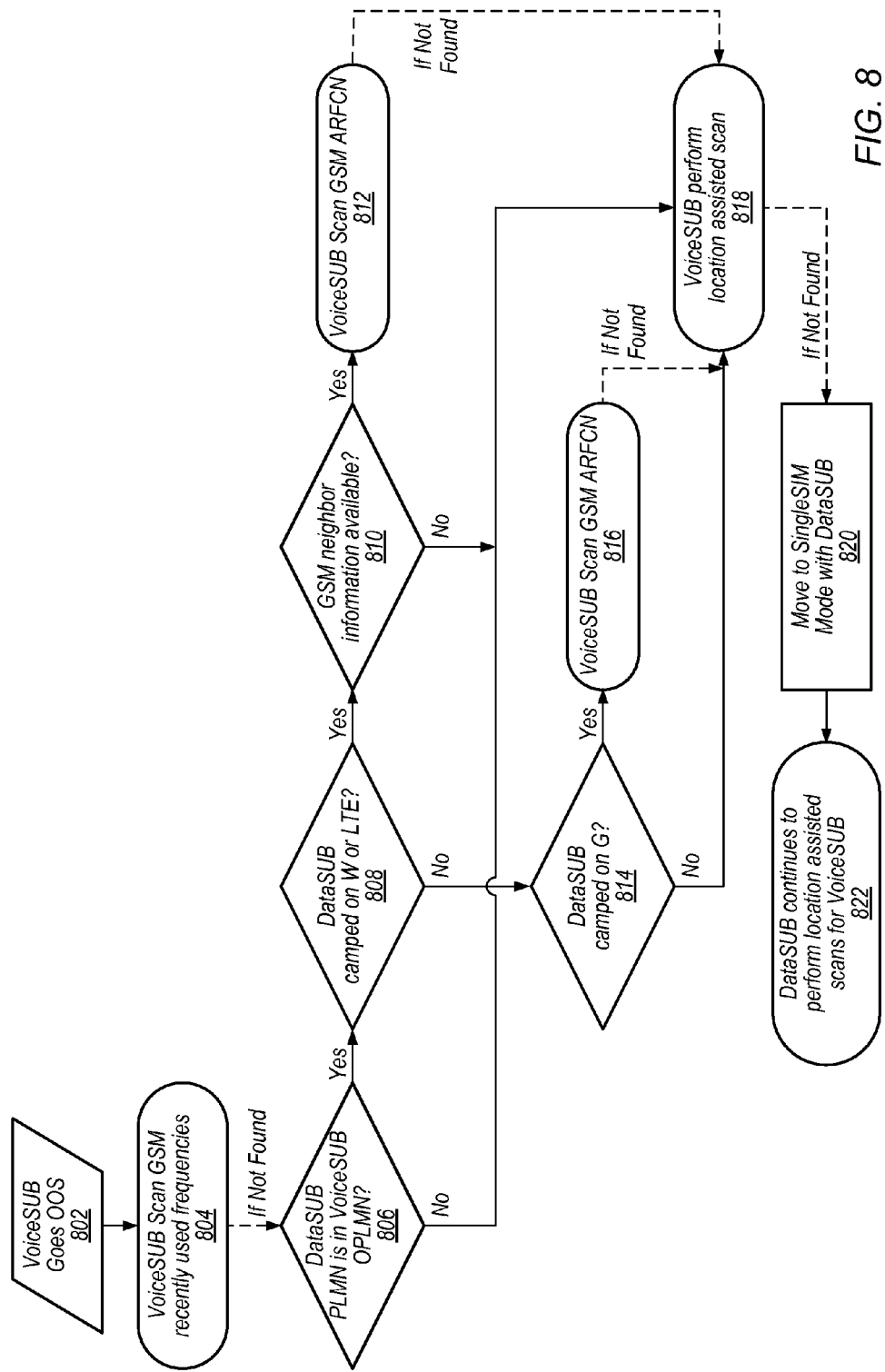

FIG. 8 is a flowchart diagram illustrating an example method that may be performed by a dual SIM UE to perform system selection in a scenario in which the voiceSUB goes out-of-service (OOS). As shown, the method of FIG. 8 may operate as follows.

In 802, the voiceSUB may go OOS.

In 804, the voiceSUB may scan any GSM frequency channels recently used by the voiceSUB. If any cells are found as a result of such scanning, the voiceSUB may camp on such a cell.

In 806, if no cells are found as a result of such scanning, it may be determined if the dataSUB PLMN is in an OPLMN list for the voiceSUB.

In 808, if the dataSUB PLMN is in the OPLMN list for the voiceSUB, it may be determined if the dataSUB is camped on a serving cell that operates according to either WCDMA or LTE.

In 810, if the dataSUB is camped on a serving cell that operates according to either WCDMA or LTE, it may be determined if GSM neighbor info is available from the dataSUB.

In 812, if GSM neighbor info is available from the dataSUB, the voiceSUB may scan the ARFCN(s) of the GSM cell(s) for which GSM neighbor info is available. If any cells are found as a result of such scanning, the voiceSUB may camp on such a cell.

In 814, if the dataSUB is not camped on a serving cell that operates according to either WCDMA or LTE, it may be determined if the dataSUB is camped on a serving cell that operates according to GSM.

In 816, if the dataSUB is camped on a serving cell that operates according to GSM, the voiceSUB may scan the ARFCN of the GSM serving cell of the dataSUB. If any cells are found as a result of such scanning, the voiceSUB may camp on such a cell.

In 818, if no cells are found as a result of such scanning, or if the dataSUB is not camped on a GSM, LTE, or WCDMA serving cell, or if the dataSUB is camped on a LTE or WCDMA serving cell but no GSM neighbor info is available, or if the dataSUB is camped on a LTE or WCDMA serving cell and GSM neighbor info is available but no cells are found as a result of scanning the frequencies for which such GSM neighbor info is available, or if the dataSUB PLMN is not in the OPLMN list of the voiceSUB, the voiceSUB may perform a location assisted scan. If any cells are found as a result of such scanning, the voiceSUB may camp on such a cell.

In 820, if no cells are found as a result of such scanning, the UE may transition to single SIM mode with the dataSUB as the active SIM.

In 822, the dataSUB may continue to perform location assisted scans for the voiceSUB while the voiceSUB enters and remains in a low power (e.g., sleep) mode.

Note that while FIG. 8 relates to an exemplary scenario in which a voiceSUB is available only for GSM in dual SIM mode, in an alternate implementation in which the voiceSUB is additionally available for WCDMA, LTE, and/or any of various other possible RATs, any number of additional or alternative steps (e.g., similar to some or all of the steps of FIG. 9) might be performed. For example, the voiceSUB might scan for WCDMA and/or LTE cells based on information from either or both of the voiceSUB or the dataSUB, in addition to scanning for GSM cells, and camp on such a cell if found.

Figure 9:
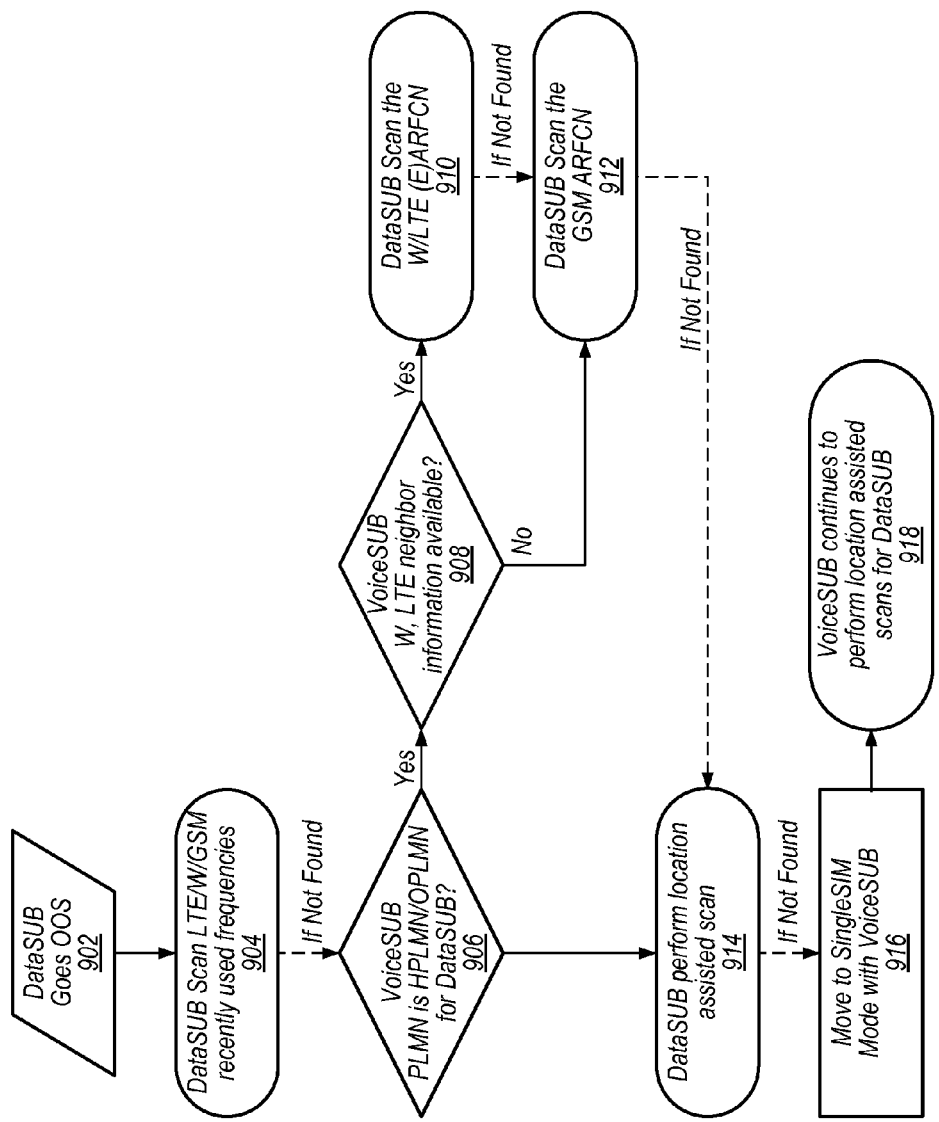

FIG. 9 is a flowchart diagram illustrating an example method that may be performed by a dual SIM UE to perform system selection in a scenario in which the dataSUB goes out-of-service (OOS). As shown, the method of FIG. 9 may operate as follows.

In 902, the dataSUB may go OOS.

In 904, the dataSUB may scan any LTE, WCDMA, or GSM frequency channels recently used by the dataSUB. If any cells are found as a result of such scanning, the dataSUB may camp on such a cell.

In 906, if no cells are found as a result of such scanning, it may be determined if the voiceSUB PLMN is in an OPLMN list for the dataSUB.

In 908, if the voiceSUB PLMN is in the OPLMN list for the dataSUB, it may be determined if WCDMA and/or LTE neighbor info is available from the voiceSUB.

In 910, if WCDMA and/or LTE neighbor info is available from the voiceSUB, the dataSUB may scan the (E)ARFCN(s) of the WCDMA/LTE cell(s) for which WCDMA and/or LTE neighbor info is available. If any cells are found as a result of such scanning, the dataSUB may camp on such a cell.

In 912, if no cells are found as a result of such scanning, or if WCDMA and/or LTE neighbor info is not available from the voiceSUB, the dataSUB may scan the GSM ARFCN of the GSM serving cell of the voiceSUB. If any cells are found as a result of such scanning, the dataSUB may camp on such a cell.

In 914, if no cells are found as a result of such scanning, or if the voiceSUB PLMN is not in the OPLMN list of the dataSUB, the dataSUB may perform a location assisted scan. If any cells are found as a result of such scanning, the dataSUB may camp on such a cell.

In 916, if no cells are found as a result of such scanning, the UE may transition to single SIM mode with the voiceSUB as the active SIM.

In 918, the voiceSUB may continue to perform location assisted scans for the dataSUB while the dataSUB enters and remains in a low power (e.g., sleep) mode.

Note also that while FIG. 9 relates to an exemplary scenario in which a voiceSUB is available only for GSM in dual SIM mode, in an alternate implementation in which the voiceSUB is additionally available for WCDMA, LTE, and/or any of various other possible RATs, any number of additional or alternative steps might be performed. For example, if the voiceSUB is camped on WCDMA or LTE, the dataSUB might scan for the WCDMA or LTE serving cell of the voiceSUB, in addition to scanning for WCDMA and/or LTE neighbor cells of the voiceSUB, and camp on such a cell if found.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a wireless user equipment device (UE):
determining to perform system selection for a first subscriber identity module (SIM) of the UE;
obtaining information from a second SIM of the UE, wherein the information obtained from the second SIM comprises one or more of serving cell and neighboring cell information for the second SIM; and
performing system selection for the first SIM based at least in part on the information obtained from the second SIM, wherein system selection comprises discovering a cell and performing a targeted search for one or more cells based on the serving cell and/or neighboring cell information obtained from the second SIM, and wherein the targeted search comprises scanning at least one of an absolute radio frequency channel number (ARFCN) or an enhanced ARFCN (EARFCN) of each of the targeted one or more cells.

2. The method of claim 1,
wherein the one or more targeted cells are searched in an order prioritized at least in part based on a radio access technology (RAT) of each of the one or more targeted cells.

3. The method of claim 1,
wherein the one or more targeted cells are searched in an order prioritized at least in part based on a public land mobile network (PLMN) of each of the one or more targeted cells.

4. The method of claim 1, further comprising:
determining that the first SIM is out-of-service (OOS),
wherein determining to perform system selection for the first SIM is based on determining that the first SIM is OOS.

5. The method of claim 1, further comprising:
determining that the UE has transitioned from a single SIM mode using the second SIM to a dual SIM mode using both the first SIM and the second SIM,
wherein determining to perform system selection for the first SIM is based on determining that the UE has transitioned from the single SIM mode the dual SIM mode.

6. The method of claim 1, further comprising:
determining that the UE has transitioned from a dual SIM mode using both the first SIM and the second SIM to a single SIM mode using the first SIM,
wherein determining to perform system selection for the first SIM is based on determining that the UE has transitioned from the dual SIM mode the single SIM mode.

7. The method of claim 6,
wherein at least a first radio access technology (RAT) is not available using the first SIM in the dual SIM mode and is available using the first SIM in the single SIM mode,
wherein at least the first RAT is available using the second SIM in the dual SIM mode,
wherein the information obtained from the second SIM is used in performing system selection for the first SIM upon transitioning from the dual SIM mode to the single SIM mode for system selection on at least the first RAT.

8. A wireless user equipment device (UE), comprising:
a radio; and
a processing element operably coupled to the radio;
wherein the radio and the processing element are configured for dual subscriber identity module (SIM) operation, wherein the radio and the processing element are configured to:
determine to perform system selection for a first SIM of the UE;
obtain one or more of serving cell information and neighboring cell information for a second SIM of the UE; and
perform system selection for the first SIM based at least in part on the information obtained from the second SIM, wherein system selection comprises discovering a cell and performing a targeted search for one or more cells based on the serving cell and/or neighboring cell information obtained from the second SIM, and wherein the targeted search comprises scanning at least one of an absolute radio frequency channel number (ARFCN) or an enhanced ARFCN (EARFCN) of each of the targeted one or more cells.

9. The UE of claim 8,
wherein the serving cell information and the neighboring cell information for the second SIM comprises, for each of a serving cell and one or more neighboring cells of the second SIM, one or more of:
absolute radio frequency channel number (ARFCN);
radio access technology (RAT); and
public land mobile network (PLMN).

10. The UE of claim 9,
wherein performing system selection for the first SIM further comprises performing a location based cell search if searching for the one or more cells for which cell information is available is unsuccessful.

11. The UE of claim 8,
wherein determining to perform system selection for the first SIM is based on the first SIM going out-of-service (OOS).

12. The UE of claim 8, wherein the radio and the processing element are further configured to, if system selection for the first SIM is unsuccessful:
place the first SIM in a sleep mode; and
scan, using the second SIM, for service for the first SIM.

13. The UE of claim 8,
wherein determining to perform system selection for the first SIM is based on a transition between a dual SIM mode and a single SIM mode.

14. The UE of claim 13, wherein the second SIM provides a data subscription, wherein the radio and the processing element are further configured to:

determine that the UE has Wi-Fi data access; and
transition from the dual SIM mode to the single SIM mode based at least in part on determining that the UE has Wi-Fi data access and the second SIM providing the data subscription.

15. A non-transitory computer accessible memory medium, comprising program instructions for a wireless user equipment device (UE) that, when executed by the UE, cause the UE to:
determine to perform system selection for a subscriber identity module (SIM) of the UE based on one of a transition between a dual SIM mode and a single SIM mode or loss of service for the SIM; and
perform system selection for the first SIM based at least in part on cell information for one or more other SIMs of the UE, wherein system selection comprises discovering a cell and performing a targeted search for one or more cells based on the serving cell and/or neighboring cell information obtained from the second SIM, and wherein the targeted search comprises scanning at least one of an absolute radio frequency channel number (ARFCN) or an enhanced ARFCN (EARFCN) of each of the targeted one or more cells.

16. The memory medium of claim 15,
wherein the cell information for the one or more other SIMs of the UE comprises serving cell and neighboring cell information for each of the one or more other SIMs.

17. The memory medium of claim 15,
wherein performing system selection for the first SIM comprises searching for one or more cells for which cell information is available based on one or more of absolute radio frequency channel number (ARFCN), radio access technology (RAT), or public land mobile network (PLMN) of the one or more cells.

18. The memory medium of claim 17,
wherein performing system selection for the first SIM further comprises performing a location based cell search if searching for the one or more cells for which cell information is available is unsuccessful.

* * * * *